(No Model.)

J. GREENBERG & E. E. LUCAS.
DEVICE FOR RAISING AND LOWERING AWNINGS.

No. 292,216. Patented Jan. 22, 1884.

Witnesses.

Geo. C. Plummer

H. N. Well

Inventors,

Jacob Greenberg,
and Emil E. Lucas,
per A. B. Upham.

UNITED STATES PATENT OFFICE.

JACOB GREENBERG AND EMIL E. LUCAS, OF PEORIA, ILLINOIS.

DEVICE FOR RAISING AND LOWERING AWNINGS.

SPECIFICATION forming part of Letters Patent No. 292,216, dated January 22, 1884.

Application filed June 5, 1883. (No model.)

*To all whom it may concern:*

Be it known that we, JACOB GREENBERG and EMIL E. LUCAS, both of Peoria, in the county of Peoria, in the State of Illinois, have invented an Improved Device for Raising and Lowering Awnings; and we do hereby declare that the following is a full, clear, and exact description thereof, reference being had to the annexed drawings, making a part of this specification, in which like letters of reference refer to like parts, and in which—

Figure 1:
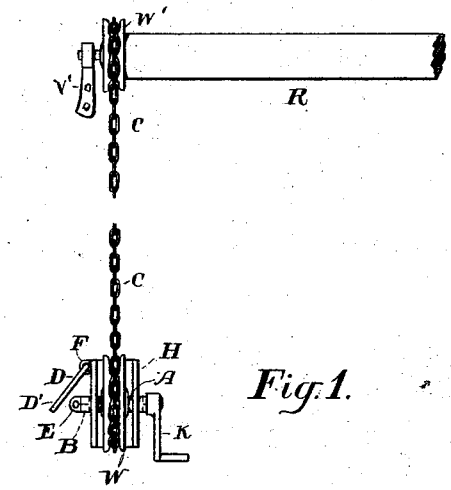
Figure 3:
Figure 2:
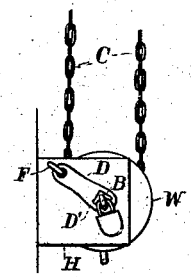
Figure 4:
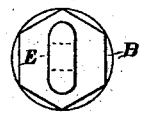

Figure 1 represents a front elevation of the same; Fig. 2, a side elevation; Figs. 3 and 4, modifications.

This invention is in that line of awnings in which one edge of the canvas is fastened to and rolled up upon a roller turning upon brackets fixed to the side of the building, the other edge of the said canvas being secured to a pivoted frame.

Our improvements relate particularly to the means for turning the roller aforesaid, and thus raising and lowering the awning.

In the drawings, R is the roller upon which the canvas composing the awning is wound. V' is one of the brackets fastened to the wall of the building to support the roller R.

The box H, fastened to the side of the building, within easy reach of any one desiring to adjust the awning, serves as bearings for the axle A, upon which is keyed or otherwise secured the chain-wheel W. One end of said axle is fitted to receive the crank-arm K, and the other end is shaped into a polygonal head, B. This head is in Fig. 2 shown to be square; but it may be flat, as in Fig. 3, hexagonal, as in Fig. 4, or any other regular polygon in section. At the extreme end of this head B is an eye, E, made large enough to allow a padlock to be locked therein. A simple pin would serve the purpose; but to prevent meddling fingers from interfering, we adapt, as shown, a padlock to have its hook inserted in said eye E. The latch D, pivoted or hinged at one end by a staple, F, to the outside of the box H, has at its free end an opening fitted to receive the head B. Rotation of the wheel W is transmitted to the wheel W', and thence to the awning-roller R, by means of an ordinary chain, C. The wheels W W' are grooved to keep the chain in place upon them, and these grooves are provided with projections to prevent the said endless chain C from slipping about the wheels. In place of such a chain and wheels, sprocket-wheels and detachable link-chains may be used, or an endless cord and grooved wheels.

In using our awning-hoisting device the latch D is removed from the head B, and by means of the crank-arm K the axle A and its chain-wheel W are revolved in the correct direction to wind up or unwind, as desired, the awning-canvas. When the awning reaches the position wished, the latch D is slipped upon the head B. The padlock, being inserted through the eye E and locked therein, prevents the said latch from coming off from the head B.

Since the opening D' of the latch D fits about the head B, and the other end of said latch is held by the staple F, the axle A, and thereby the wheel W, chain-wheel W', and roller R, are all retained immovably in their desired position.

What we claim as our invention, and for which we desire Letters Patent, is as follows, to wit:

1. In a device for raising and lowering awnings, the axle A, having polygonal head B, wheel W, and suitable bearings, in combination with the latch D, having opening D' to fit said head B, and means for preventing said latch from slipping off from said head, substantially as and for the purpose specified.

2. The wheel W and axle A, having head B and eye F, in combination with suitable frame, and the latch D, swiveled thereto and having the opening D', for the purpose set forth.

3. An awning-roller, R, having wheel W', and the axle A, having wheel W, whereby to transmit its motion of rotation to said roller-wheel W' through a suitable chain, in combination with frame or box H, staple F, and the latch D, having opening D', for receiving a polygonal or prismatic head formed at the end of said axle, substantially as and for the purpose herein described.

4. The axle A, having head B, with eye E therein, and the crank-arm K, in combination with the box H, staple F, latch D, having opening D', wheels W W', and chain C, substantially as and for the purpose specified.

In testimony that we claim the foregoing invention we have hereunto set our hands this 25th day of May, 1883.

JACOB GREENBERG.
EMIL E. LUCAS.

Witnesses:
JUDSON STARR,
RICHD. A. GOLDSBROUGH.